United States Patent
Sweeney et al.

(10) Patent No.: US 10,614,715 B2
(45) Date of Patent: Apr. 7, 2020

(54) SYSTEMS AND METHODS FOR COMMUNICATING AUTONOMOUS VEHICLE CONFIDENCE LEVELS

(71) Applicant: UATC, LLC, San Francisco, CA (US)

(72) Inventors: Matthew Sweeney, Pittsburgh, PA (US); Brian Douglas Cullinane, Mountain View, CA (US)

(73) Assignee: UATC, LLC, San Francisco, CA (US)

(*) Notice: Subject to any disclaimer, the term of this patent is extended or adjusted under 35 U.S.C. 154(b) by 243 days.

(21) Appl. No.: 15/650,028

(22) Filed: Jul. 14, 2017

(65) Prior Publication Data
US 2019/0019411 A1    Jan. 17, 2019

(51) Int. Cl.
*B60Q 1/50* (2006.01)
*G08G 1/16* (2006.01)
*B60Q 5/00* (2006.01)

(52) U.S. Cl.
CPC ............ *G08G 1/163* (2013.01); *B60Q 1/50* (2013.01); *B60Q 5/005* (2013.01); *G08G 1/164* (2013.01); *G08G 1/165* (2013.01); *G08G 1/166* (2013.01)

(58) Field of Classification Search
CPC ........ G08G 1/163; G08G 1/165; G08G 1/166; G08G 1/164; B60Q 1/50; B60Q 1/26; B60Q 5/005
USPC ........................................ 701/24; 340/426.15
See application file for complete search history.

(56) References Cited

U.S. PATENT DOCUMENTS

| | | | |
|---|---|---|---|
| 8,954,252 B1* | 2/2015 | Urmson | G08G 1/166 180/167 |
| 2014/0222277 A1* | 8/2014 | Tsimhoni | G01C 21/3697 701/23 |
| 2015/0336502 A1* | 11/2015 | Hillis | B60Q 1/26 701/23 |
| 2017/0120804 A1* | 5/2017 | Kentley | G05D 1/0088 |
| 2017/0212515 A1* | 7/2017 | Bertollini | B60Q 9/00 |
| 2017/0291615 A1* | 10/2017 | Kusano | B60W 50/14 |
| 2018/0173237 A1* | 6/2018 | Reiley | G05D 1/0214 |
| 2018/0326982 A1* | 11/2018 | Paris | B60W 30/0956 |
| 2018/0361918 A1* | 12/2018 | Bertollini | B60W 30/09 |

* cited by examiner

*Primary Examiner* — Nadeem Odeh
(74) *Attorney, Agent, or Firm* — Dority & Manning, P.A.

(57) ABSTRACT

Systems and methods for communicating autonomous vehicle confidence levels are provided. In one example embodiment, a computer implemented method includes obtaining, by a computing system including one or more computing devices onboard an autonomous vehicle, data associated with the autonomous vehicle. The method includes determining, by the computing system, a vehicle confidence level associated with one or more system actions of the autonomous vehicle based at least in part on the data associated with the autonomous vehicle. The method includes determining, by the computing system, an external vehicle indication that is indicative of the vehicle confidence level. The method includes outputting, by the computing system via an output device onboard the autonomous vehicle, the external vehicle indication that is indicative of the vehicle confidence level. The external vehicle indication is outputted to at least a portion of a surrounding environment of the autonomous vehicle.

16 Claims, 8 Drawing Sheets

SYSTEMS AND METHODS FOR COMMUNICATING AUTONOMOUS VEHICLE CONFIDENCE LEVELS

FIELD

The present disclosure relates generally to communicating the confidence levels of an autonomous vehicle with respect to the actions of the vehicle's computing system.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for communicating autonomous vehicle confidence levels. The method includes obtaining, by a computing system including one or more computing devices onboard an autonomous vehicle, data associated with the autonomous vehicle. The method includes determining, by the computing system, a vehicle confidence level associated with one or more system actions of the autonomous vehicle based at least in part on the data associated with the autonomous vehicle. The method includes determining, by the computing system, an external vehicle indication that is indicative of the vehicle confidence level. The method includes outputting, by the computing system via an output device onboard the autonomous vehicle, the external vehicle indication that is indicative of the vehicle confidence level. The external vehicle indication is outputted to at least a portion of a surrounding environment of the autonomous vehicle.

Another example aspect of the present disclosure is directed to a computing system for communicating autonomous vehicle confidence levels. The computing system includes one or more processors and one or more memory devices. The one or more memory devices store instructions that when executed by the one or more processors cause the computing system to perform operations. The operations include obtaining a first set of data associated with an autonomous vehicle. The operations include determining a first vehicle confidence level associated with one or more system actions of the autonomous vehicle based at least in part on the first set of data associated with the autonomous vehicle. The operations include outputting, via an output device onboard the autonomous vehicle, a first external vehicle indication that is indicative of the first vehicle confidence level. The first external vehicle indication is outputted to at least a portion of a surrounding environment of the autonomous vehicle.

Yet another example aspect of the present disclosure is directed to an autonomous vehicle. The autonomous vehicle includes one or more output devices, one or more processors, and one or more memory devices. The one or more memory devices store instructions that when executed by the one or more processors cause the autonomous vehicle to perform operations. The operations include obtaining data associated with the autonomous vehicle. The operations include determining a vehicle confidence level associated with the autonomous vehicle based at least in part on the data associated with the autonomous vehicle. The operations include determining an external vehicle indication that is indicative of the vehicle confidence level. The operations include outputting, via the one or more output devices, the external vehicle indication that is indicative of the vehicle confidence level. The external vehicle indication is outputted to at least a portion of a surrounding environment of the autonomous vehicle.

Other example aspects of the present disclosure are directed to systems, methods, vehicles, apparatuses, tangible, non-transitory computer-readable media, and memory devices for communicating autonomous vehicle confidence levels.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
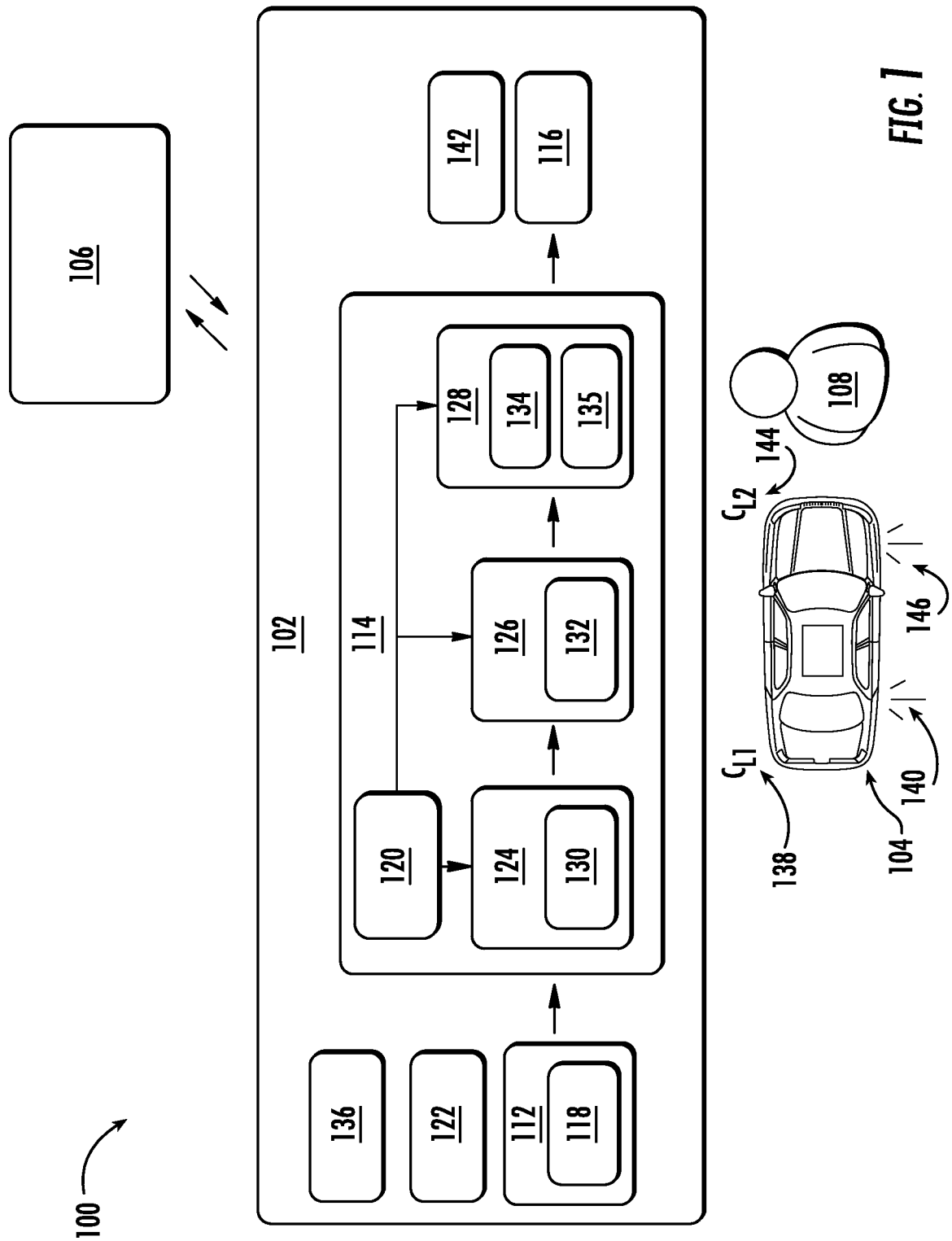
FIG. 1 depicts an example computing system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to communicating the confidence level of an autonomous vehicle with respect to the actions of the vehicle's computing system. For instance, an autonomous vehicle can be a vehicle that can drive, navigate, operate, etc. without a human operator present in the vehicle. To do so, the autonomous vehicle can perform various vehicle actions to autonomously navigate through its surroundings. For example, the autonomous vehicle can obtain sensor data from sensor(s) onboard the vehicle (e.g., cameras, LIDAR, RADAR) and classify the object(s) within its surroundings (e.g., as a vehicle, pedestrian, bicycle, other object). The autonomous vehicle can predict the respective motion of each of the classified objects. Moreover, the autonomous vehicle can plan its motion through its surrounding environment with respect to these objects and the predicted movement of the objects.

When the vehicle's computing system is performing each of these system actions (e.g., perceiving objects, predicting object motion, planning vehicle motion), the autonomous vehicle can determine a vehicle confidence level associated with the respective action. By way of example, the autonomous vehicle can determine a vehicle confidence level that is indicative of the vehicle's confidence in its determined motion plan given the conditions of the surrounding environment (e.g., weather, location/motion of objects, etc.), the conditions of the vehicle (e.g., the vehicle's knowledge of map data associated with a specific geographic area, etc.), and/or other information. The confidence level (e.g., a value, percentage, range, etc.) can be based, for example, on heuristic cost data (e.g., cost functions) utilized to plan the vehicle's motion. The autonomous vehicle can output an external vehicle indication (e.g., a visual indication) that is indicative of the vehicle confidence level to the surrounding environment, such that it is viewable by an object outside of the vehicle (e.g., a driver of another vehicle, pedestrian, bicyclist, etc.). For example, the vehicle can produce a lighting effect that is red in the event that the confidence is low, yellow in the event that the confidence is moderate, and/or green in the event that the confidence is high. In this way, the autonomous vehicle can provide the objects surrounding the vehicle with contextual information as to the vehicle's confidence in its current system actions.

More particularly, an autonomous vehicle can be a ground-based autonomous vehicle (e.g., car, truck, bus, etc.) or another type of vehicle that can operate with minimal and/or no interaction from a human operator. The autonomous vehicle can include a vehicle computing system located onboard the autonomous vehicle to help control the autonomous vehicle. The vehicle computing system is located onboard the autonomous vehicle, in that the vehicle computing system is located on or within the autonomous vehicle. The vehicle computing system can include one or more sensors (e.g., cameras, LIDAR, RADAR, etc.), an autonomy computing system (e.g., for determining autonomous navigation), one or more vehicle control systems (e.g., for controlling braking, steering, powertrain), etc. The sensor(s) can gather sensor data (e.g., image data, radar data, lidar data, etc.) associated with one or more object(s) that are proximate to the autonomous vehicle (e.g., within a field of view of the sensor(s)). The object(s) can include, for example, other vehicles (their operators), bicycles, pedestrians, etc. The sensor data can be indicative of characteristics (e.g., locations) associated with the object(s) at one or more times. The sensor(s) can provide such sensor data to the vehicle's autonomy computing system.

In addition to the sensor data, the autonomy computing system can retrieve or otherwise obtain map data that provides other detailed information about the surrounding environment of the autonomous vehicle. The map data can provide information regarding: the identity and location of different roadways, road segments, buildings, or other items; the location and directions of traffic lanes (e.g., the boundaries, location, direction, etc. of a parking lane, a turning lane, a bicycle lane, or other lanes within a particular travel way); traffic control data (e.g., the location and instructions of signage, traffic lights, or other traffic control devices); and/or any other map data that provides information that assists the computing system in comprehending and perceiving its surrounding environment and its relationship thereto.

The autonomy computing system can be a computing system that includes various sub-systems that cooperate to perceive the surrounding environment of the autonomous vehicle and determine a motion plan for controlling the motion of the autonomous vehicle. For example, the autonomy computing system can include a perception system, a prediction system, and a motion planning system.

The perception system can be configured to perceive one or more objects within the surrounding environment of the autonomous vehicle. For instance, the perception system can process the sensor data from the sensor(s) to detect the one or more objects that are proximate to the autonomous vehicle as well as state data associated therewith. The state data for each object can describe an estimate of the object's current location (also referred to as position), current speed/velocity, current acceleration, current heading, current orientation, size/footprint, class (e.g., vehicle class vs. pedestrian class vs. bicycle class), and/or other state information.

The prediction system can be configured to predict a motion of the object(s) within the surrounding environment of the autonomous vehicle. For instance, the prediction system can create predicted data associated with one or more of the objects. The predicted data can be indicative of one or more predicted future locations of each respective object. In particular, the predicted data can indicate a predicted path associated with each object. The predicted path can be indicative of a trajectory along which the respective object is predicted to travel over time (and/or the speed at which the object is predicted to travel along the predicted path).

The motion planning system can be configured to plan the motion of the autonomous vehicle. For instance, the motion planning system can determine a motion plan for the autonomous vehicle based at least in part on the predicted data and/or other data such as a vehicle route for which the autonomous vehicle is to follow. The motion plan can include vehicle motion actions (e.g., changes in heading, speed, etc.) with respect to the objects proximate to the vehicle as well as the predicted movements. For instance, the motion planning system can implement an optimization algorithm that considers cost data associated with a vehicle motion action as well as other objective functions (e.g., cost functions based on speed limits, traffic lights, etc.), if any, to determine optimized variables that make up the motion plan. By way of example, the motion planning system can determine that the vehicle can perform a certain motion action (e.g., pass an object) without increasing the potential risk to the vehicle and/or violating any traffic laws (e.g., speed limits, lane boundaries, signage, etc.). The vehicle motion actions can be determined to control a motion of the autonomous vehicle, for example, without user input to the autonomous vehicle. The motion plan can include these vehicle motion actions to be performed by the autonomous vehicle, a planned trajectory, a vehicle speed, a vehicle acceleration, etc.

The vehicle computing system can be configured to determine a vehicle confidence level associated with the system action(s) of the vehicle computing system (e.g., of the autonomy computing system). The vehicle confidence level can be indicative of the vehicle's confidence in its ability to perform and/or the performance of the system action (e.g., object perception, object motion prediction, motion planning, etc.). The vehicle confidence level can be expressed as a percentage, a value (e.g., corresponding z-value, etc.), a range (e.g., confidence intervals), and/or other measurements.

To help determine vehicle confidence levels, the vehicle computing system can obtain data associated with the autonomous vehicle. The data associated with the autonomous vehicle can be data that is created onboard the autonomous vehicle as the autonomous vehicle travels through the surrounding environment (e.g., without user input from a human operator). Such data can include, for example, the state data, prediction data, and/or motion planning data, as described herein. The vehicle computing system can be configured to determine a vehicle confidence level associated with one or more system actions based at least in part on this data associated with the autonomous vehicle. By way of example, when perceiving one or more objects within the vehicle's surrounding environment, the perception system can calculate a vehicle confidence level associated with the classification of an object. In such an implementation, the vehicle confidence level can be indicative of the vehicle's confidence in the accuracy of the classification of the object (e.g., as a vehicle, pedestrian, bicycle, etc.). In another example, when predicting the motion of an object within the vehicle's surrounding environment, the prediction system can calculate a vehicle confidence level associated with the predicted movement of an object. In such an implementation, the vehicle confidence level can be indicative of the vehicle's confidence that the object will travel in accordance with the predicted path, at a predicted speed, within a predicted time, etc. In another example, when planning the motion of the autonomous vehicle, the motion planning system can calculate a vehicle confidence level associated with the determined vehicle motion actions. The vehicle confidence level can be indicative of the vehicle's confidence in the vehicle motion actions planned by the vehicle computing system and/or performed by the autonomous vehicle to navigate through the surrounding environment. In some implementations, the vehicle confidence level can be determined based on the cost data used to determine the vehicle motion (e.g., the confidence in the appropriateness of the motion decided using the heuristic cost functions).

In some implementations, the vehicle confidence level can be based at least in part on one or more conditions associated with the surrounding environment of the autonomous vehicle. For instance, the condition(s) can include a weather condition. By way of example, the vehicle confidence level associated with perceiving objects within the surrounding environment may be lower during a hail storm, which may affect the quality of the sensor data obtained by the vehicle's sensors (and used to determine the state data). Additionally, or alternatively, the condition(s) associated with the surrounding environment can include a position of an object relative to the autonomous vehicle. For example, the autonomous vehicle can be configured to have a preferred distance (e.g., radial distance) between the autonomous vehicle and any objects within the surrounding environment. Such a threshold distance envelop can help the autonomous vehicle plan its motion with respect to the object(s) because it can provide the autonomous vehicle with room to properly maneuver with respect to these object(s). In the event that an object is located within the threshold distance from the autonomous vehicle (e.g., within the distance envelop), the confidence level associated with planning vehicle motion may be lower as the vehicle attempts control its motion with respect to the closely positioned object.

In some implementations, the vehicle confidence level can be affected by the map data associated with a geographic area. For instance, the data associated with the autonomous vehicle can include the map data obtained by the vehicle computing system. The vehicle computing system can determine a vehicle confidence level based at least in part on the map data. For example, the autonomous vehicle may be travelling in a geographic area (e.g., new development) for which the map data contains less detailed information. As such, the vehicle confidence level associated with planning the vehicle's motion may be lower due to the less robust map data.

The vehicle computing system can determine an external vehicle indication that is indicative of the vehicle confidence level. An external vehicle indication can be a communication that can be viewed, heard, and/or otherwise received by an object that is located within the surrounding environment of the autonomous vehicle (e.g., in proximity to the autonomous vehicle). For example, the external vehicle indication can include a visual indication and/or an auditory indication that can be seen and/or heard by an operator of another vehicle, a bicyclist, a pedestrian, etc. within proximity of the autonomous vehicle.

To determine the external vehicle indication, the vehicle computing system can access a data structure stored, for example, in a memory onboard the autonomous vehicle. The data structure can include a rule, table, list, tree, and/or other type of data structure that indicates one or more parameters for the external vehicle indications. For instance, the external vehicle indication can include a visual indication such as, for example, a lighting effect that is visible from the exterior of the autonomous vehicle. The data structure can be indicative of a color scheme that identifies a plurality of colors associated with a plurality of vehicle confidence levels. By way of example, the external vehicle indications can include a lighting effect that is red in the event that the confidence is low, yellow in the event that the confidence is moderate, and/or green in the event that the confidence is high. The vehicle computing system can access the data structure and identify which of the colors is associated with the vehicle confidence level determined by the vehicle computing system. Additionally, or alternatively, the external vehicle indication can include an auditory indication such as, for example, an audible message, sound, etc. that can be heard outside of the autonomous vehicle. The data structure can be indicative of the type of message and/or sound to be produced for the various levels of confidence.

In some implementations, the type of external vehicle indication can be based at least in part on the type(s) of object(s) within the surrounding environment of the autonomous vehicle. For example, the vehicle computing system may classify an object surrounding the vehicle as a pedestrian. As such, the vehicle computing system can determine that the external vehicle indication should include both a visual and an auditory indication (e.g., in case the pedestrian is visually impaired). In another example, the vehicle computing system may classify the objects surrounding the autonomous vehicle as other vehicles (e.g., with human drivers). As such, the vehicle computing system can determine that the external vehicle indication may include only a visual indication (e.g., because the driver of another vehicle is unlikely to hear the auditory indication). In this way, the autonomous vehicle can tailor its external vehicle indications to its potential audience to cater to the potential needs of the audience, while also saving valuable processing and memory resources when possible (by avoiding unnecessary indications).

The vehicle computing system can output the external vehicle indication via one or more output devices located onboard the autonomous vehicle to at least a portion of the surrounding environment of the autonomous vehicle. In some implementations, the output device(s) can include one or more lighting elements. The external vehicle indication can include a visual indication that is provided via the one or more lighting elements. By way of example, the output device(s) can include ground effects lighting element(s) that can be configured to produce various colors of light (e.g., in accordance with the color scheme). The vehicle computing system can provide one or more control signals to illuminate the one or more lighting elements to produce light in accordance with an identified color. In another example, the output device(s) can be included in a LIDAR system of the autonomous vehicle. The visual indication (and its associated color) can be displayed via the output device(s) of the LIDAR system (e.g., as it rotates). In some implementations, the output device(s) can include an audio output device (e.g., external speaker). The vehicle computing system can provide one or more control signals to cause the audio output device to audibly produce the external vehicle indication (e.g., an auditory indication).

In some implementations, the external vehicle indication can be directed to an object that affected the vehicle confidence level. An object can be within a preferred distance (e.g., threshold distance envelope) of the autonomous vehicle. The object can be, for example, another vehicle that is tailgating the autonomous vehicle and/or operating erratically (e.g., driving erratically). As such, the actions of the object (e.g., encroaching the preferred distance, operating erratically, etc.) can decrease the vehicle confidence level. The vehicle computing system can identify the object that is affecting/has affected the vehicle confidence level. The vehicle computing system can output the external vehicle indication (e.g., via the output device(s)) such that the external vehicle indication is directed (at least partially) to the object that is affecting/has affected the vehicle confidence level. For example, the vehicle computing system can send one or more control signals to activate a visual output device and/or auditory output device to output the external vehicle indication. The external indication can be observed (e.g., seen, heard, etc.) by the object that is affecting/has affected the vehicle confidence level. In some implementations, the activated output device is at least partially directed to the object (e.g., located at the rear of the autonomous vehicle). As such, the object (e.g., its operator) that affected the vehicle confidence level can be more likely to observe the external vehicle indication. In this way, the vehicle computing system can inform a specific object (that affects the vehicle confidence level) of the vehicle confidence level. This can hopefully affect the behavior of the object with respect to the autonomous vehicle (e.g., to stop tailgating, stop operating erratically, etc.).

The vehicle computing system can be configured to update the vehicle confidence level. For example, the vehicle computing system can obtain a second set of data associated with the autonomous vehicle. The second set of data can include, for instance, updated motion planning data generated under different conditions, at a different time, etc. than previous motion planning data. For example, the previous motion planning data may have been generated while an object (e.g., another vehicle) was within a threshold distance from the autonomous vehicle (e.g., within the vehicle's distance envelope). As such, the vehicle confidence level may have been lower with respect to the vehicle's motion plan. The updated motion planning data, however, may be generated when the other object is further away from the autonomous vehicle (e.g., beyond the threshold distance). As such, the updated vehicle confidence level may be higher with respect to the vehicle's updated motion plan. The vehicle computing system can output an external vehicle indication indicative of the updated confidence level accordingly (e.g., change the lighting color from red to green).

The systems and methods described herein may provide a number of technical effects and benefits. More particularly, the systems and methods enable a vehicle computing system to provide objects surrounding the vehicle with context regarding the vehicle's decision making process. For example, the autonomous vehicle can externalize its internal heuristic decision analysis (e.g., using cost functions) via the external vehicle indications. As such, the autonomous vehicle can better inform others of the vehicle's comfort level with its current system actions, surrounding environment, terrain, etc. Objects within the surrounding environment of the autonomous vehicle can utilize the external vehicle indications to better avoid potential interference (e.g., collisions) with an autonomous vehicle (e.g., that may be proceeding through an area with caution). For example, an operator of another vehicle can adjust the motion of the other vehicle (e.g., slow speed, pass with greater distance, etc.) in the event that the autonomous vehicle indicates that it is proceeding with lower confidence (e.g., via a red ground effect light). Moreover, the systems and methods described herein can help increase third party understanding of autonomous vehicles to a level that is not otherwise available when an operator is omitted from the vehicle.

The systems and methods of the present disclosure also provide an improvement to vehicle computing technology, such as autonomous vehicle computing technology. For instance, the computer-implemented methods and systems improve the ability of the vehicle computing technology to communicate its internal decision making/processes to objects within the vehicle's surrounding environment. For example, the systems and methods can enable a computing system (e.g., onboard an autonomous vehicle) to obtain data associated with the autonomous vehicle. The computing system can determine a vehicle confidence level associated with one or more system actions of the autonomous vehicle based at least in part on the data associated with the autonomous vehicle. The computing system can determine an external vehicle indication that is indicative of the vehicle confidence level. The computing system can output, via an output device onboard the autonomous vehicle, the external vehicle indication that is indicative of the vehicle confidence level. As described herein, the external vehicle indication can be outputted to at least a portion of a surrounding environment of the autonomous vehicle. In this way, the computing system can leverage the data determined for autonomous vehicle operation (e.g., the data associated with the object perception, object motion prediction, vehicle motion planning, etc.) to identify the vehicle's confidence level in its system actions and provide indications regarding the same. As such, an autonomous vehicle can alert objects within its surrounding environment of the vehicle's automated decision-making processes and the vehicle's current comfort level, without the need for a human operator present in the autonomous vehicle.

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 104. In some implementations, the system 100 can include an operations computing system 106 that is remote from the vehicle 104.

In some implementations, the vehicle 104 can be associated with an entity (e.g., a service provider, owner, manager). The entity can be one that offers one or more vehicle service(s) to a plurality of users via a fleet of vehicles that includes, for example, the vehicle 104. In some implementations, the entity can be associated with only vehicle 104 (e.g., a sole owner, manager). In some implementations, the operations computing system 106 can be associated with the entity. The vehicle 104 can be configured to provide one or more vehicle services to one or more users. The vehicle service(s) can include transportation services (e.g., rideshare services in which user rides in the vehicle 104 to be transported), courier services, delivery services, and/or other types of services. The vehicle service(s) can be offered to users by the entity, for example, via a software application (e.g., a mobile phone software application). The entity can utilize the operations computing system 106 to coordinate and/or manage the vehicle 104 (and its associated fleet, if any) to provide the vehicle services to a user.

The operations computing system 106 can include one or more computing devices that are remote from the vehicle 104 (e.g., located off-board the vehicle 104). For example, such computing device(s) can be components of a cloud-based server system and/or other type of computing system that can communicate with the vehicle computing system 102 of the vehicle 104. The computing device(s) of the operations computing system 106 can include various components for performing various operations and functions. For instance, the computing device(s) can include one or more processor(s) and one or more tangible, non-transitory, computer readable media (e.g., memory devices). The one or more tangible, non-transitory, computer readable media can store instructions that when executed by the one or more processor(s) cause the operations computing system 106 (e.g., the one or more processors, etc.) to perform operations and functions, such as providing data to and/or receiving data from the vehicle 104, for managing a fleet of vehicles (that includes the vehicle 104), etc.

The vehicle 104 incorporating the vehicle computing system 102 can be a ground-based autonomous vehicle (e.g., car, truck, bus, etc.), an air-based autonomous vehicle (e.g., airplane, helicopter, or other aircraft), or other types of vehicles (e.g., watercraft, etc.). The vehicle 104 can be an autonomous vehicle that can drive, navigate, operate, etc. with minimal and/or no interaction from a human operator 108 (e.g., driver). In some implementations, a human operator 108 can be omitted from the vehicle 104 (and/or also omitted from remote control of the vehicle 104). In some implementations, a human operator 108 can be included in the vehicle 104.

The vehicle 104 can be configured to operate in a plurality of operating modes. The vehicle 104 can be configured to operate in a fully autonomous (e.g., self-driving) operating mode in which the vehicle 104 is controllable without user input (e.g., can drive and navigate with no input from a human operator 108 present in the vehicle 104 and/or remote from the vehicle 104). The vehicle 104 can operate in a semi-autonomous operating mode in which the vehicle 104 can operate with some input from a human operator 108 present in the vehicle 104 (and/or remote from the vehicle 104). The vehicle 104 can enter into a manual operating mode in which the vehicle 104 is fully controllable by a human operator 108 (e.g., human driver, pilot, etc.) and can be prohibited from performing autonomous navigation (e.g., autonomous driving). In some implementations, the vehicle 104 can implement vehicle operating assistance technology (e.g., collision mitigation system, power assist steering, etc.) while in the manual operating mode to help assist the human operator 108 of the vehicle 104.

The operating modes of the vehicle 104 can be stored in a memory onboard the vehicle 104. For example, the operating modes can be defined by an operating mode data structure (e.g., rule, list, table, etc.) that indicates one or more operating parameters for the vehicle 104, while in the particular operating mode. For example, an operating mode data structure can indicate that the vehicle 104 is to autonomously plan its motion when in the fully autonomous operating mode. The vehicle computing system 102 can access the memory when implementing an operating mode.

The operating mode of the vehicle 104 can be adjusted in a variety of manners. In some implementations, the operating mode of the vehicle 104 can be selected remotely, off-board the vehicle 104. For example, an entity associated with the vehicle 104 (e.g., a service provider) can utilize the operations computing system 106 to manage the vehicle 104 (and/or an associated fleet). The operations computing system 106 can send one or more control signals to the vehicle 104 instructing the vehicle 104 to enter into, exit from, maintain, etc. an operating mode. By way of example, the operations computing system 106 can send one or more control signals to the vehicle 104 instructing the vehicle 104 to enter into the fully autonomous operating mode. In some implementations, the operating mode of the vehicle 104 can be set onboard and/or near the vehicle 104. For example, the vehicle computing system 102 can automatically determine when and where the vehicle 104 is to enter, change, maintain, etc. a particular operating mode (e.g., without user input). Additionally, or alternatively, the operating mode of the vehicle 104 can be manually selected via one or more interfaces located onboard the vehicle 104 (e.g., key switch, button, etc.) and/or associated with a computing device proximate to the vehicle 104 (e.g., a tablet operated by authorized personnel located near the vehicle 104). In some implementations, the operating mode of the vehicle 104 can be adjusted based at least in part on a sequence of interfaces located on the vehicle 104. For example, the operating mode may be adjusted by manipulating a series of interfaces in a particular order to cause the vehicle 104 to enter into a particular operating mode.

The vehicle computing system 102 can include one or more computing devices located onboard the vehicle 104. For example, the computing device(s) can be located on and/or within the vehicle 104. The computing device(s) can include various components for performing various operations and functions. For instance, the computing device(s) can include one or more processor(s) and one or more tangible, non-transitory, computer readable media (e.g., memory devices). The one or more tangible, non-transitory, computer readable media can store instructions that when executed by the one or more processor(s) cause the vehicle 104 (e.g., its computing system, one or more processors, etc.) to perform operations and functions, such as those described herein for communicating vehicle confidence levels.

As shown in FIG. 1, the vehicle 104 can include one or more sensors 112, an autonomy computing system 114, one or more vehicle control systems 116, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The sensor(s) 112 can be configured to acquire sensor data 118 associated with one or more objects that are proximate to the vehicle 104 (e.g., within a field of view of one or more of the sensor(s) 112). The sensor(s) 112 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 118 can include image data, radar data, LIDAR data, and/or other data acquired by the sensor(s) 112. The object(s) can include, for example, pedestrians, vehicles, bicycles, and/or other objects. The object(s) can be located in front of, to the rear of, and/or to the side of the vehicle 104. The sensor data 118 can be indicative of locations associated with the object(s) within the surrounding environment of the vehicle 104 at one or more times. The sensor(s) 112 can provide the sensor data 118 to the autonomy computing system 114.

In addition to the sensor data 118, the autonomy computing system 114 can retrieve or otherwise obtain map data 120. The map data 120 can provide detailed information about the surrounding environment of the vehicle 104. For example, the map data 120 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle 104 in comprehending and perceiving its surrounding environment and its relationship thereto. In some implementations, the vehicle computing system 102 can determine a vehicle route for the vehicle 104 based at least in part on the map data 120.

The vehicle 104 can include a positioning system 122. The positioning system 122 can determine a current position of the vehicle 104. The positioning system 122 can be any device or circuitry for analyzing the position of the vehicle 104. For example, the positioning system 122 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 104 can be used by various systems of the vehicle computing system 102 and/or provided to a remote computing device (e.g., of the operations computing system 106). For example, the map data 120 can provide the vehicle 104 relative positions of the surrounding environment of the vehicle 104. The vehicle 104 can identify its position within the surrounding environment (e.g., across six axes) based at least in part on the data described herein. For example, the vehicle 104 can process the sensor data 118 (e.g., LIDAR data, camera data) to match it to a map of the surrounding environment to get an understanding of the vehicle's position within that environment.

The autonomy computing system 114 can include a perception system 124, a prediction system 126, a motion planning system 128, and/or other systems that cooperate to perceive the surrounding environment of the vehicle 104 and determine a motion plan for controlling the motion of the vehicle 104 accordingly. For example, the autonomy computing system 114 can receive the sensor data 118 from the sensor(s) 112, attempt to comprehend the surrounding environment by performing various processing techniques on the sensor data 118 (and/or other data), and generate an appropriate motion plan through such surrounding environment. The autonomy computing system 114 can control the one or more vehicle control systems 116 to operate the vehicle 104 according to the motion plan.

The autonomy computing system 114 can identify one or more objects that are proximate to the vehicle 104 based at least in part on the sensor data 118 and/or the map data 120. For example, the perception system 124 can obtain state data 130 descriptive of a current state of an object that is proximate to the vehicle 104. The state data 130 for each object can describe, for example, an estimate of the object's: current location (also referred to as position); current speed (also referred to as velocity); current acceleration; current heading; current orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can create predicted data 132 associated with each of the respective one or more objects proximate to the vehicle 104. The predicted data 132 can be indicative of one or more predicted future locations of each respective object. The predicted data 132 can be indicative of a predicted path (e.g., predicted trajectory) of at least one object within the surrounding environment of the vehicle 104. For example, the predicted path (e.g., trajectory) can indicate a path along which the respective object is predicted to travel over time (and/or the speed at which the object is predicted to travel along the predicted path). The prediction data 132 can be created iteratively at a plurality of time steps such that the predicted movement of the objects can be updated, adjusted, confirmed, etc. over time. The prediction system 126 can provide the predicted data 132 associated with the object(s) to the motion planning system 128.

The motion planning system 128 can determine a motion plan 134 for the vehicle 104 based at least in part on the predicted data 132 (and/or other data). The motion plan 134 can include vehicle actions with respect to the objects proximate to the vehicle 104 as well as the predicted movements. For instance, the motion planning system 128 can implement an optimization algorithm that considers cost data 135 associated with a vehicle action as well as other objective functions (e.g., cost functions based on speed limits, traffic lights, etc.), if any, to determine optimized variables that make up the motion plan 134. By way of example, the motion planning system 128 can determine that the vehicle 104 can perform a certain action (e.g., pass an object) without increasing the potential risk to the vehicle 104 and/or violating any traffic laws (e.g., speed limits, lane boundaries, signage). The motion plan 134 can include a planned trajectory, speed, acceleration, other actions, etc. of the vehicle 104. The motion plan 134 can be indicative of vehicle actions (e.g., actions to be taken by the vehicle 104 at a time and/or location) as well as the time and/or location at which these actions are to be taken by the vehicle 104.

The vehicle computing system 102 can cause the vehicle 104 to act in accordance with the motion plan 134. For example, the motion planning system 128 can provide the motion plan 134 with data indicative of the future vehicle actions, a planned trajectory, and/or other operating parameters to the vehicle control system(s) 116 to implement the motion plan 134 for the vehicle 104. For instance, the vehicle 104 can include a controller configured to translate the motion plan 134 into instructions. By way of example, the controller can translate a determined vehicle action into instructions to adjust the steering of the vehicle 104 "X" degrees, apply a certain magnitude of braking force, etc. The controller can send one or more control signals to the responsible vehicle control component (e.g., braking control system, steering control system, acceleration control system) to execute the instructions and implement the vehicle action.

The vehicle 104 can include a communications system 136 configured to allow the vehicle computing system 102 (and its computing device(s)) to communicate with other computing devices. The vehicle computing system 102 can use the communications system 136 to communicate with the operations computing system 106 and/or one or more other remote computing device(s) over one or more networks (e.g., via one or more wireless signal connections). In some implementations, the communications system 136 can allow communication among one or more of the system(s) on-board the vehicle 104. The communications system 136 can include any suitable components for interfacing with one or more network(s), including, for example, transmitters, receivers, ports, controllers, antennas, and/or other suitable components that can help facilitate communication.

The vehicle computing system 102 can be configured to determine a vehicle confidence level 138 associated with the vehicle 104. For example, the vehicle confidence level can be associated with one or more system actions of the vehicle computing system 102 (e.g., the action(s) of the autonomy computing system 114). For example, the vehicle confidence level 138 can be indicative of the vehicle's confidence in its ability to perform and/or the performance of the system action(s). The system action(s) can include object perception, object motion prediction, motion planning, and/or other actions performed by the vehicle computing system 102 (e.g., the autonomy computing system 114). The vehicle confidence level 138 can be expressed as a percentage, a value (e.g., corresponding z-value, etc.), a range (e.g., confidence intervals), and/or other measurements.

To help determine a vehicle confidence level 138, the vehicle computing system 102 can obtain data associated with the vehicle 104 (e.g., a first set of data associated with the vehicle 104). The data associated with the vehicle 104 can be data that is created onboard the vehicle 104 as the vehicle 104 travels through the surrounding environment (e.g., without user input from a human operator 108 present in the vehicle 104 and/or remote therefrom). The data associated with the vehicle 104 can include, for example, the state data 130, prediction data 132, motion planning data 134, and/or other data. The data associated with the vehicle 104 can be obtained via at least one of a perception system 124 of the vehicle 104, a prediction system 126 of the vehicle 104, or a motion planning system 128 of the vehicle 104. In some implementations, the data associated with the vehicle 104 can include other data such as, for example, map data 120, traffic data, weather data, etc.

Figure 2:
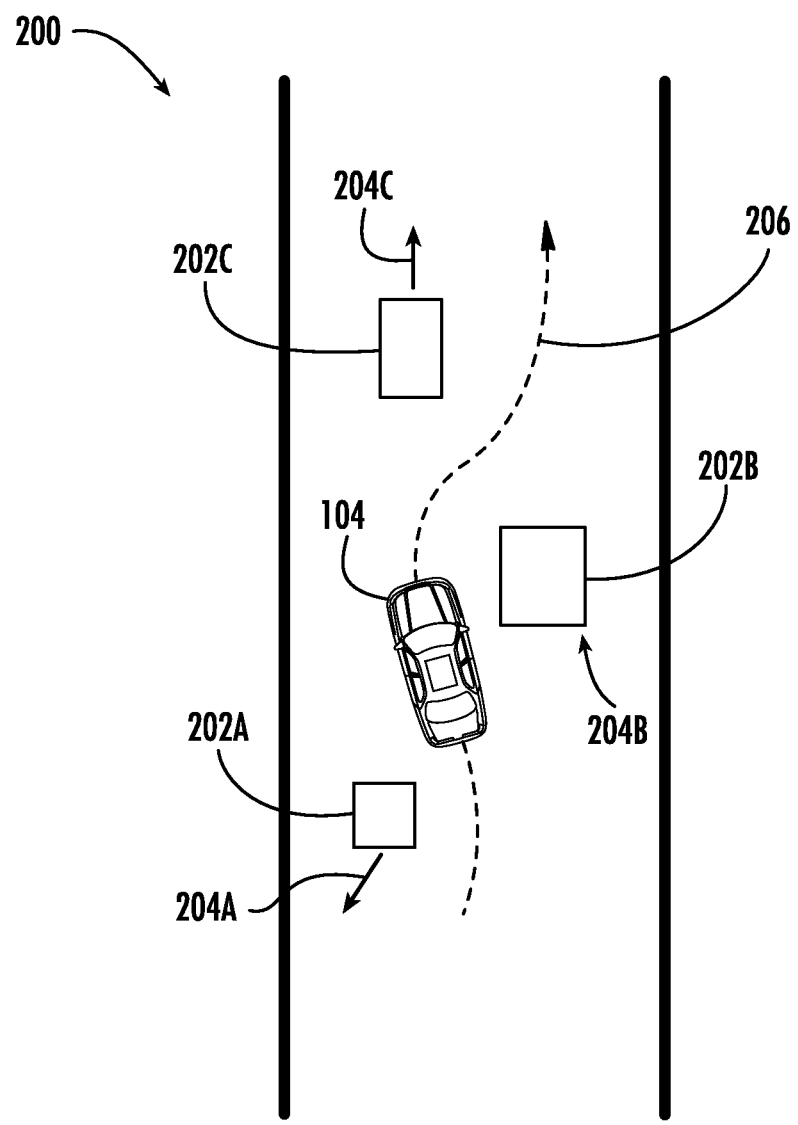
FIG. 2 depicts a diagram of an example travel way of a geographic area according to example embodiments of the present disclosure.

The vehicle computing system 102 can determine a vehicle confidence level 138 (e.g., a first vehicle confidence level "$C_{L1}$") associated the vehicle 104 (e.g., with one or more system actions of the vehicle 104) based at least in part on the data associated with the vehicle 104 (e.g., the first set of data). For example, FIG. 2 depicts an example travel way 200 of a geographic area. The vehicle 104 can travel along the travel way 200 (e.g., to reach a destination). When doing so, the vehicle computing system 102 can obtain sensor data 118 associated with one or more objects 202A-C that are proximate to the vehicle 104. When perceiving the one or more objects 202A-C within the vehicle's surrounding environment (e.g., obtaining state data 130), the vehicle computing system 102 (e.g., the perception system 124) can calculate a vehicle confidence level 138 associated with the perception of an object 202A-C. In such an implementation, the vehicle confidence level 138 can be indicative of the vehicle's confidence in the accuracy of the classification of the object (e.g., as a vehicle, pedestrian, bicycle, etc.). By way of example, the vehicle computing system 102 (e.g., the autonomy system 114) can process the sensor data 118 associated with the object 202A and identify the object 202A as a pedestrian (e.g., based on one or more features of the sensor data 118), the object 202B as a vehicle, and/or the object 206C as a bicycle. The vehicle computing system 102 can generate a vehicle confidence level 138 associated with the autonomy computing system's specific classification of these objects 202A-C. For example, such a vehicle confidence level 138 can indicate the vehicle's confidence that the object 202A is a pedestrian, that the object 202B is a vehicle, and/or that the object 202C is a bicycle.

Additionally, or alternatively, the vehicle computing system 102 can identify a vehicle confidence level 138 associated with the predicted motion of the objects 202A-C. For example, the vehicle computing system 102 (e.g., the autonomy computing system 114) can predict that the object 202A is to travel in accordance with the predicted object motion path 204A (e.g., with a particular heading, during a particular time, at a particular speed, etc.). The vehicle computing system 102 can predict that the object 202B is to remain stationary (e.g., a parked vehicle) at location 204B, for a particular time period. The vehicle computing system 102 can predict that the object 202C is to travel in accordance with the predicted object motion path 204C (e.g., with a particular heading, during a particular time, at a particular speed, etc.). When predicting the motion of the object(s) 202A-C within the vehicle's surrounding environment, the vehicle computing system 102 (e.g., the prediction system 126) can calculate a vehicle confidence level 138 associated with the predictions (e.g., predicted movement) of one or more of the object(s) 202A-C. Such vehicle confidence level 138 can be indicative of, for example, the vehicle's confidence that the object 202A-C will travel in accordance with the predicted path (e.g., at a predicted heading, at a predicted speed, within a predicted time, etc.) and/or remain stationary (e.g., at a particular location, for a particular time, etc.).

Additionally, or alternatively, the vehicle computing system 102 can identify a vehicle confidence level 138 associated with the motion plan 134 of the vehicle 104. For example, the vehicle computing system 102 (e.g., the motion planning system 128) can create a motion plan 134 for the vehicle 104 based at least in part on the predicted data 132 associated with the objects 202A-C, the cost data 135, and/or other data (e.g., vehicle route data, map data 120, sensor data 118, state data 130, traffic data, weather data, etc.). The motion plan 134 can include, for example, one or more trajectories 206 for the vehicle 104 to follow as it travels along the travel way 200. The vehicle control system(s) 116 can control the motion of the vehicle 104 such that it performs one or more vehicle motion actions to follow along the one or more trajectories 206 of the motion plan 134 (e.g., avoiding the objects 202A-C). When creating the motion plan 134 for the vehicle 104, the vehicle computing system 102 (e.g., the motion planning system 134) can calculate a vehicle confidence level 138 associated with the determined motion plan 134. Such a vehicle confidence level 138 can be indicative of the vehicle's confidence in the vehicle motion actions planned by the vehicle computing system 102 and/or performed by the vehicle 104 to navigate through the surrounding environment. In some implementations, the vehicle confidence level 138 associated with the vehicle 104 can be based at least in part on the cost data 135 (e.g., heuristic cost functions) utilized by the motion planning system 128 to plan a motion of the vehicle 104. For example, the vehicle confidence level 138 can be calculated using the cost data 135 when creating the motion plan 134. Such a vehicle confidence level 138 can be indicative of the vehicle computing system's confidence in the appropriateness of the vehicle motion as determined using the heuristic cost functions (e.g., given the objects 202A-C, predicted object motion, etc.).

In some implementations, the vehicle confidence level 138 can be based at least in part on other data associated with the vehicle 104. For instance, the vehicle confidence level 138 can be affected by the map data 120 associated with the travel way 200 (and/or geographic area) in which the vehicle 104 is travelling or will travel. By way of example, the vehicle 104 may be travelling along a travel way 200 and/or in a geographic area (e.g., new development) for which the map data 120 contains less detailed information. As such, the vehicle confidence level 138 associated with predicting object motion, planning the vehicle's motion, etc. may be lower due to the less robust map data 120 associated with the travel way 200 and/or geographic area.

In some implementations, the vehicle confidence level 138 can be based at least in part on one or more conditions associated with the surrounding environment of the vehicle 104. For instance, the condition(s) can include a weather condition. By way of example, the vehicle confidence level 138 associated with perceiving objects 202A-C, predicting object motion, and/or planning the motion of vehicle 104 within the surrounding environment may be lower during adverse weather conditions (e.g., a hail storm), which may affect the quality of the sensor data 118 obtained by the vehicle's sensors 112 (e.g., used to determine the state data 130).

Figure 3:
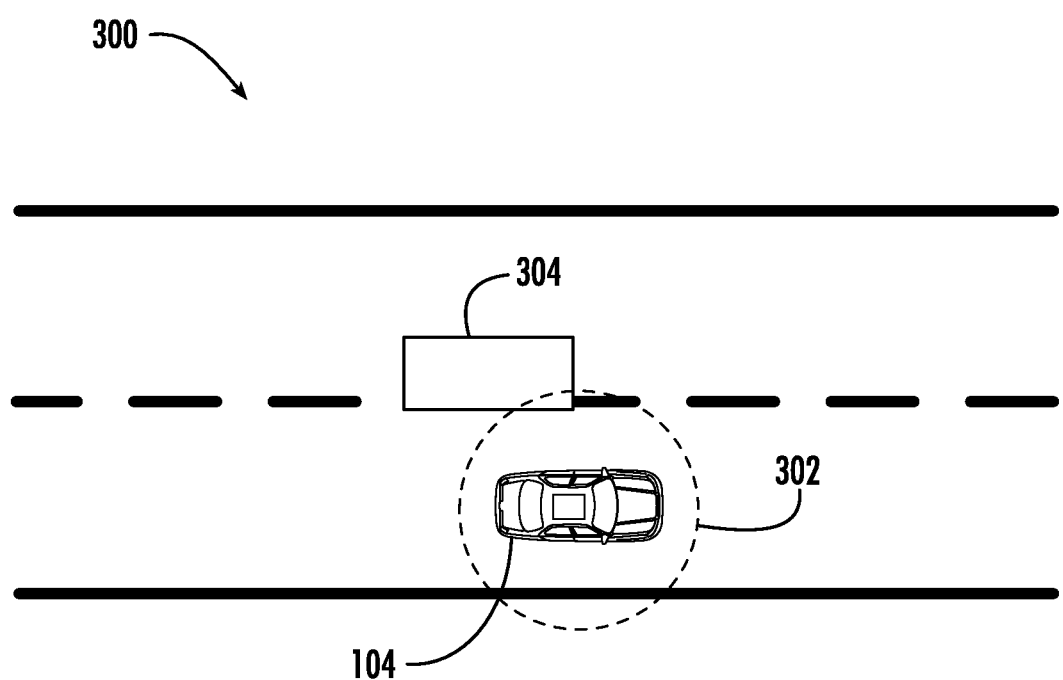
FIG. 3 depicts a diagram of an example travel way with an autonomous vehicle according to example embodiments of the present disclosure.

Additionally, or alternatively, the condition(s) associated with the surrounding environment can include a position of an object relative to the vehicle 104. FIG. 3 depicts a diagram of an example travel way 300 with the vehicle 104 according to example embodiments of the present disclosure. The vehicle 104 can be configured to have a preferred distance 302 (e.g., radial distance) between the vehicle 104 and one or more objects within the surrounding environment. Such a threshold distance envelop can help the vehicle computing system 102 plan the motion of the vehicle 104 with respect to the object(s) within the vehicle's surrounding environment. For example, the preferred distance 302 can be selected to allow the vehicle 104 room to properly maneuver with respect to the object(s) within the vehicle's surrounding environment. The vehicle computing system 102 can evaluate the sensor data 118 to determine if any objects are within the preferred distance 302. In the event that an object 304 (e.g., another vehicle that is tailgating the vehicle 104, operating erratically) is located within the preferred distance 302 from the vehicle 104 (e.g., within the threshold distance), the vehicle confidence level 138 associated with predicting object motion, planning vehicle motion, etc. may be lower as the vehicle computing system 102 attempts control its motion with respect to the closely positioned object 304. As further described herein, the vehicle computing system 102 can be configured to communicate the vehicle confidence level 138 to the object 304 (e.g., the object that is affecting the vehicle confidence level 138).

Returning to FIG. 1, the vehicle computing system 102 can determine an external vehicle indication 140 (e.g., a first external vehicle indication) that is indicative of the vehicle confidence level 138. An external vehicle indication 140 can be a communication that can be viewed, heard, and/or otherwise received by an object that is located within the surrounding environment of the vehicle 104 (e.g., in proximity to the vehicle 104). For example, the external vehicle indication 140 can include a visual indication and/or an auditory indication that can be seen and/or heard by an operator of another vehicle, a bicyclist, a pedestrian, etc. within proximity of the vehicle 104.

Figure 4:
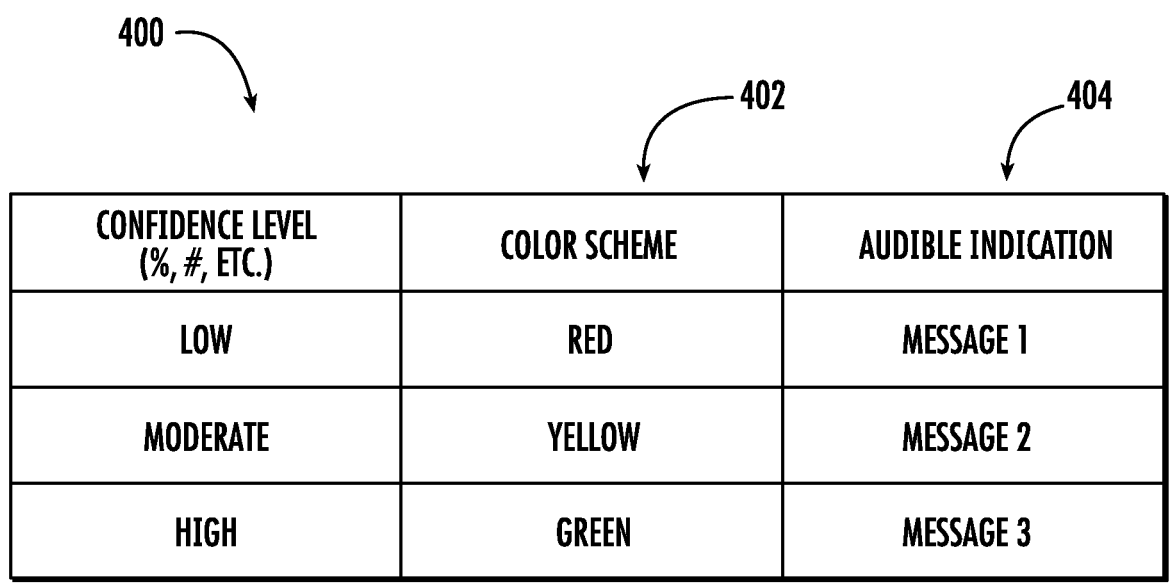
FIG. 4 depicts an example data structure according to example embodiments of the present disclosure.

In some implementations, to determine the external vehicle indication, the vehicle computing system 102 can access a data structure stored, for example, in a memory onboard the vehicle 104. The vehicle computing system 102 can determine the external vehicle indication 140 based at least in part on the data structure. FIG. 4 depicts an example data structure 400 according to example embodiments of the present disclosure. The data structure 400 can include a rule, table, list, tree, and/or other type of data structure that indicates one or more parameters for one or more external vehicle indications 140. For instance, the external vehicle indication 140 can include a visual indication such as, for example, a lighting effect that is visible from the exterior of the vehicle 104. As shown in FIG. 4, the data structure 400 can be indicative of a color scheme 402 that identifies a plurality of colors associated with a plurality of vehicle confidence levels. By way of example, an external vehicle indication 140 can include a lighting effect that includes the color red in the event that the associated vehicle confidence level 138 is low, a lighting effect that includes the color yellow in the event that the associated vehicle confidence level 138 is moderate, and/or a lighting effect that includes the color green in the event that the associated vehicle confidence level 138 is high. A vehicle confidence level 138 can be considered low in the event that the vehicle confidence level 138 is within a first confidence range, moderate in the event that the vehicle confidence level 138 is within a second confidence range, and/or high in the event that the vehicle confidence level 138 is within a third confidence range. The vehicle computing system 102 can access the data structure 400 in a memory located onboard the vehicle 104 and identify a color of the plurality of colors (e.g., in the color scheme 402) for the determined vehicle confidence level 138 based at least in part on the data structure 400 (e.g., identify which of the colors is associated with the vehicle confidence level 138).

The colors described herein and shown in FIG. 4 are not intended to be limiting. One or more other colors (and/or color schemes) can be used in addition to and/or instead of the colors (and/or color scheme 402) described herein and shown in FIG. 4. In some implementations, the external vehicle indication 140 can be associated with other visual characteristics in addition, or alternatively, to a color scheme. For example, the external vehicle indication 140 can communicate the specific vehicle confidence level 138 via a brightness level (e.g., the brighter the lighting effect—the lower the confidence level, or vice versa), a lighting frequency (e.g., the higher frequency (e.g., flashing) of the light effect—the lower the confidence level, or vice-versa), and/or other adjustable visual characteristics.

Additionally, or alternatively, the external vehicle indication can include an auditory indication such as, for example, an audible message, sound, etc. that can be heard outside of the vehicle 104. The data structure 400 can be indicative of an auditory scheme 404 that indicates, for example, the type of message and/or sound to be produced for the various vehicle confidence levels. In some implementations, the external vehicle indication 140 can be associated with other audible characteristics. For example, the external vehicle indication 140 can communicate the specific vehicle confidence level 138 via a volume level (e.g., the higher the volume—the lower the confidence level, or vice versa), an audible frequency (e.g., the more a message/sound is repeated—the lower the confidence level, or vice-versa), and/or other adjustable visual characteristics.

In some implementations, the type of external vehicle indication 140 can be based at least in part on the type(s) of object(s) within the surrounding environment of the vehicle 104. For example, the vehicle computing system 102 can classify an object 202A proximate to the vehicle 104 as a pedestrian. As such, the vehicle computing system 102 can determine that the external vehicle indication 140 should include both a visual and an auditory indication (e.g., in case the pedestrian is visually impaired). In another example, the vehicle computing system 102 can classify an object 202B as another vehicle (e.g., with a human operator). As such, the vehicle computing system 102 can determine that the external vehicle indication 140 may include only a visual indication (e.g., because the operator of another vehicle is unlikely to hear the auditory indication). This can enable to vehicle computing system 102 to customize the external vehicle indication 140 to better reach those objects, while also saving valuable processing and memory resources when possible (by avoiding unnecessary indications).

Returning to FIG. 1, the vehicle computing system 102 can output the external vehicle indication 140 that is indicative of the vehicle confidence level 138 via one or more output devices 142 located onboard the vehicle 104. The external vehicle indication 140 can be outputted to at least a portion of a surrounding environment of the vehicle 104 (e.g., a portion in which one or more objects are located). For example, the external vehicle indication 140 can be outputted such that objects to the front, side, and/or rear of the vehicle 104 can see, hear, and/or other receive the external vehicle indication 140. The output device(s) 142 can include one or more devices that are configured to produce an indication that can be received (e.g., seen, heard, etc.). For example, the one or more output devices 142 can be located on an exterior of the vehicle 104 and/or outwardly facing from the vehicle interior. The output device(s) 142 can include one or more visual output devices (e.g., lighting element, display device, etc.) and/or one or more an audio output device(s) (e.g., speaker, etc.).

Figure 5:
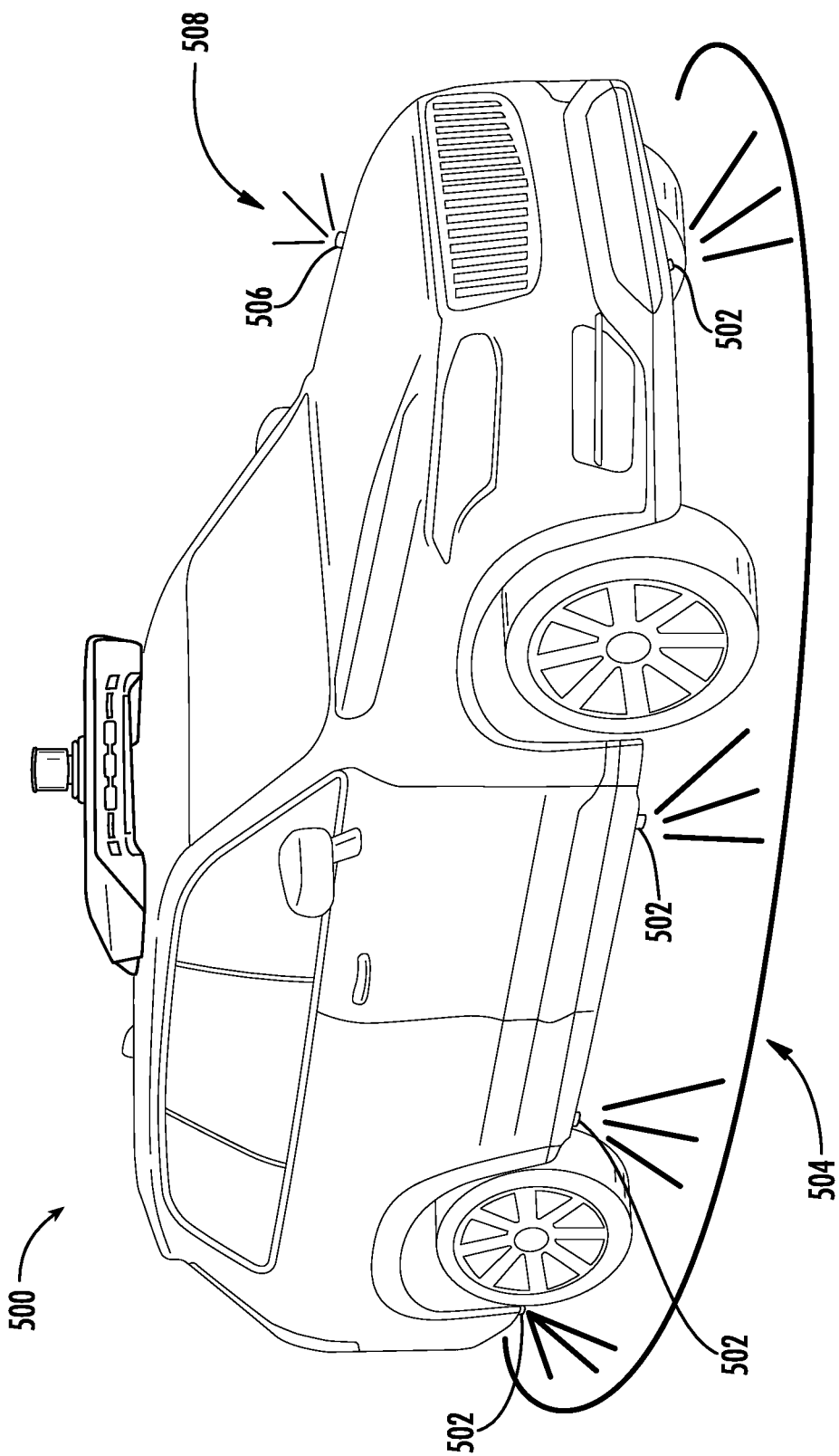
FIG. 5 depicts an example autonomous vehicle with example external vehicle indications according to example embodiments of the present disclosure.

In some implementations, the output device(s) 142 can include one or more lighting elements. The external vehicle indication 140 can include a visual indication that is provided via the one or more lighting elements. For example, FIG. 5 depicts an example vehicle 500 according to example embodiments of the present disclosure. The vehicle 104 can be the vehicle 500. The output device(s) 502 can be configured to produce a visual lighting effect 504 associated with the external vehicle indication 140 such as, for a ground lighting effect. The output device(s) 502 can include ground effects lighting element(s) that can be configured to produce various colors of light (e.g., in accordance with the color scheme 402). The vehicle computing system 102 can provide one or more control signals to activate the output device(s) 502 (e.g., illuminate the one or more lighting elements) to produce light (e.g., a ground lighting effect) in accordance with an identified color and/or other visual characteristics (e.g., as indicated by the data structure 400).

In some implementations, the output device(s) 142 can include an audio output device (e.g., external speaker). For example, as shown in FIG. 5, the vehicle 104 can include an audio output device 506 (e.g., speaker, other sound producing device, etc.). The external vehicle indication 140 can include an auditory indication 508 (e.g., message, other sound, etc.). The vehicle computing system 102 can provide one or more control signals to cause the audio output device 506 to audibly produce the external vehicle indication 140 (e.g., the auditory indication 508).

Figure 6:
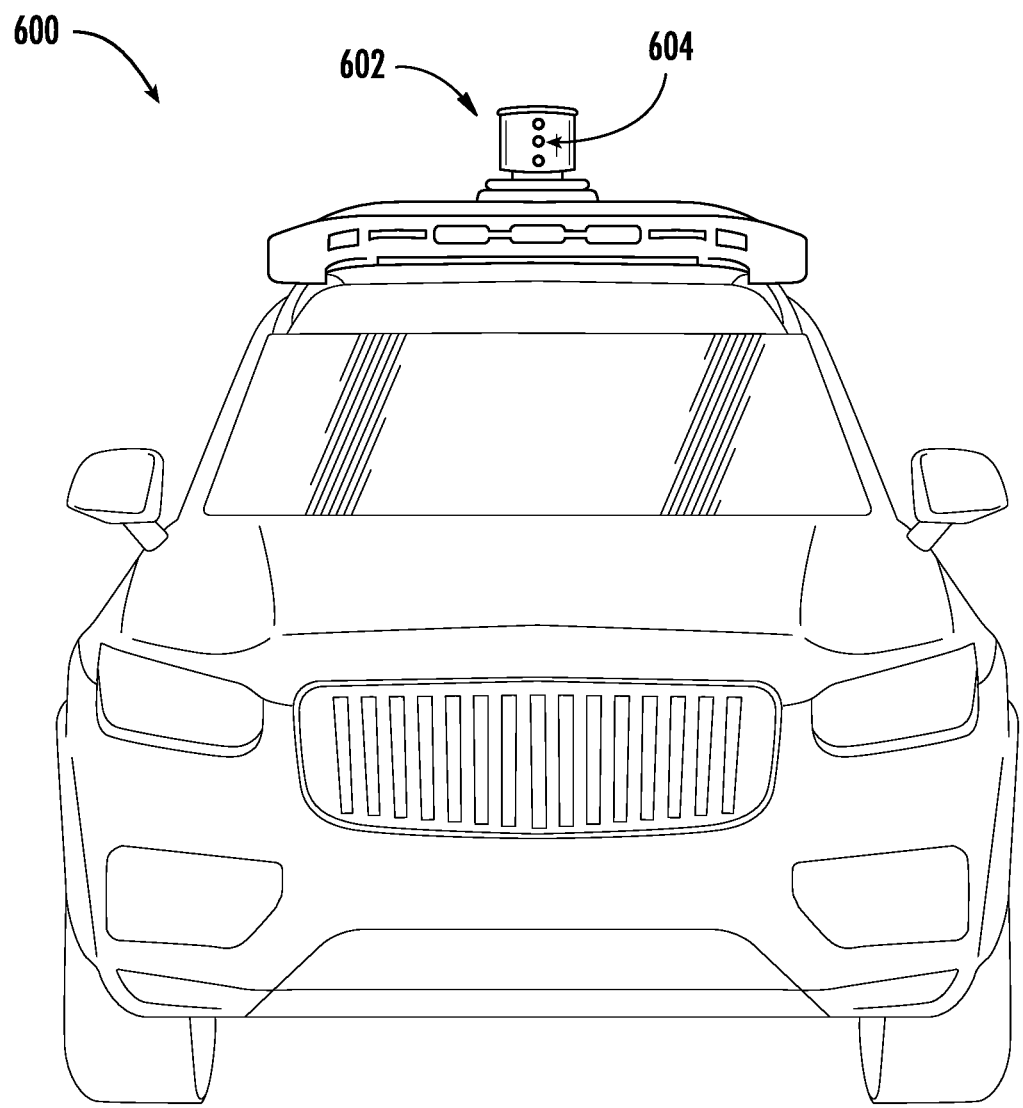
FIG. 6 depicts a portion of an example autonomous vehicle with an example output device according to example embodiments of the present disclosure.

Additionally, or alternatively, the output device(s) 142 can be included in and/or otherwise associated with a LIDAR system of the vehicle 104. For example, FIG. 6 depicts an example vehicle 600 according to example embodiments of the present disclosure. The vehicle 104 can be the vehicle 600. The vehicle 600 can include a LIDAR system 602. The LIDAR system 602 can include one or more output device(s) 604 (e.g., visual output devices, auditory output devices). The external vehicle indication 140 can be outputted by the LIDAR system 602. For example, the external vehicle indication 140 can include a visual indication (with an associated color). The vehicle computing system 102 can send one or more control signals to cause the visual indication to be provided via the output devices 604 of the LIDAR system 602 (e.g., as it rotates). In some implementations, the vehicle 600 can use the LIDAR system 602 to provide the external vehicle indication 140 across 360 degrees to the surrounding environment. In some implementations, the external vehicle indication 140, outputted via the LIDAR system 602, can be provided to only a portion of the surrounding environment, such that the visual indication is only visible from a certain position with respect to the vehicle 104 (e.g., to the rear of the vehicle 600).

In some implementations, the external vehicle indication 140 can be directed to an object that affected the vehicle confidence level 138. For instance, as described herein with reference to FIG. 3, the object 304 can be within a preferred distance 302 (e.g., threshold distance envelope) of the vehicle 104. The object 304 can be, for example, a vehicle that is tailgating the vehicle 104 and/or operating erratically (e.g., driving erratically). As such, the actions of the object 304 (e.g., encroaching the preferred distance 302, operating erratically, etc.) can affect the vehicle confidence level 138 (e.g., decrease the vehicle confidence level 138). The vehicle computing system 102 can identify the object 304 that is affecting and/or has affected the vehicle confidence level 138 associated with the vehicle 104. The vehicle computing system 102 can output the external vehicle indication 140 (e.g., via the output device(s) 142) such that it can be heard, seen, and/or otherwise received by the object (and/or its operator, if any). In some implementations, the external vehicle indication 140 can be directed (at least partially) to the object 304 that is affecting (or has affected) the vehicle confidence level 138. For example, the vehicle computing system 102 can provide one or more control signals to activate a visual output device and/or auditory output device that is at least partially directed to the object 304 (e.g., located at the rear of the vehicle 104, to the side of the vehicle 104, etc.), to cause the output device to output the external vehicle indication 140. As such, the object 304 (e.g., its operator) that affected the vehicle confidence level 138 associated with the vehicle 104 can be more likely to see, hear, etc. the external vehicle indication 140. In this way, the vehicle computing system 102 can inform a specific object (e.g., that affects the vehicle confidence level 138) of the vehicle confidence level 138. In the event that the vehicle confidence level 138 is decreased because of the object 304, the vehicle computing system 102 can, thus, inform the object 304 of its detrimental effect on the vehicle 104 (e.g., by projecting red light, changing from green to yellow to red, etc.).

Returning to FIG. 1, the vehicle computing system 102 can be configured to update the vehicle confidence level associated with the vehicle 104. For example, the vehicle computing system 102 can obtain a second set of data associated with the vehicle 104. The second set of data can include updated state data (e.g., under different weather conditions), updated prediction data (e.g., generated using updated state data, updated map data, etc.), updated motion planning data (e.g., generated under different conditions, at a different time, etc. than previous motion planning data), and/or other data. The vehicle computing system 102 can identify a second vehicle confidence level 144 associated with the one or more system actions of the vehicle 104 (e.g., the autonomy system's object perception, object motion prediction, motion planning, etc.) based at least in part on the second set of data associated with the vehicle 104. The vehicle computing system 102 can determine a second external vehicle indication 146 that is indicative of the second vehicle confidence level 144 (e.g., via the data structure 400). The vehicle computing system 102 can cease the output of the first external vehicle indication 140 (e.g., by providing one or more control signals to stop output of the first external vehicle indication 140 via the output device(s) 142). The vehicle computing system 102 can output, via the output device(s) 142 onboard the vehicle 104, a second external vehicle indication 146 that is indicative of the second vehicle confidence level 144. For example, the vehicle computing system 102 can provide one or more control signals to cause the output device(s) 142 to output the second external vehicle indication 146.

By way of example, a previous motion plan of the vehicle 104 may have been generated while the object 304 (e.g., another vehicle) was within the preferred distance 302 of the vehicle 104 (e.g., within the vehicle's threshold distance envelope). As such, the first vehicle confidence level 138 may have been lower with respect to the vehicle's motion plan. Updated motion planning data, however, may be generated when the object 304 is further away from the vehicle 104 (e.g., beyond the preferred distance 302). As such, the second vehicle confidence level 144 may be higher with respect to the vehicle's updated motion plan. The vehicle computing system 102 can output a second external vehicle indication 146 indicative of the second vehicle confidence level 144 accordingly (e.g., by changing the lighting color from red to green). In some implementations, the vehicle computing system 102 can selectively output the second external vehicle indication 146 indicative of the second vehicle confidence level 144 to an object that affected the vehicle confidence level, as described herein. This can enable the vehicle computing system 102 to indicate that the object's actions have increased the vehicle confidence level (e.g., by no longer tailgating the vehicle 104) or decreased the vehicle confidence level (e.g., by further encroaching the preferred distance 302 of the vehicle 104).

Figure 7:
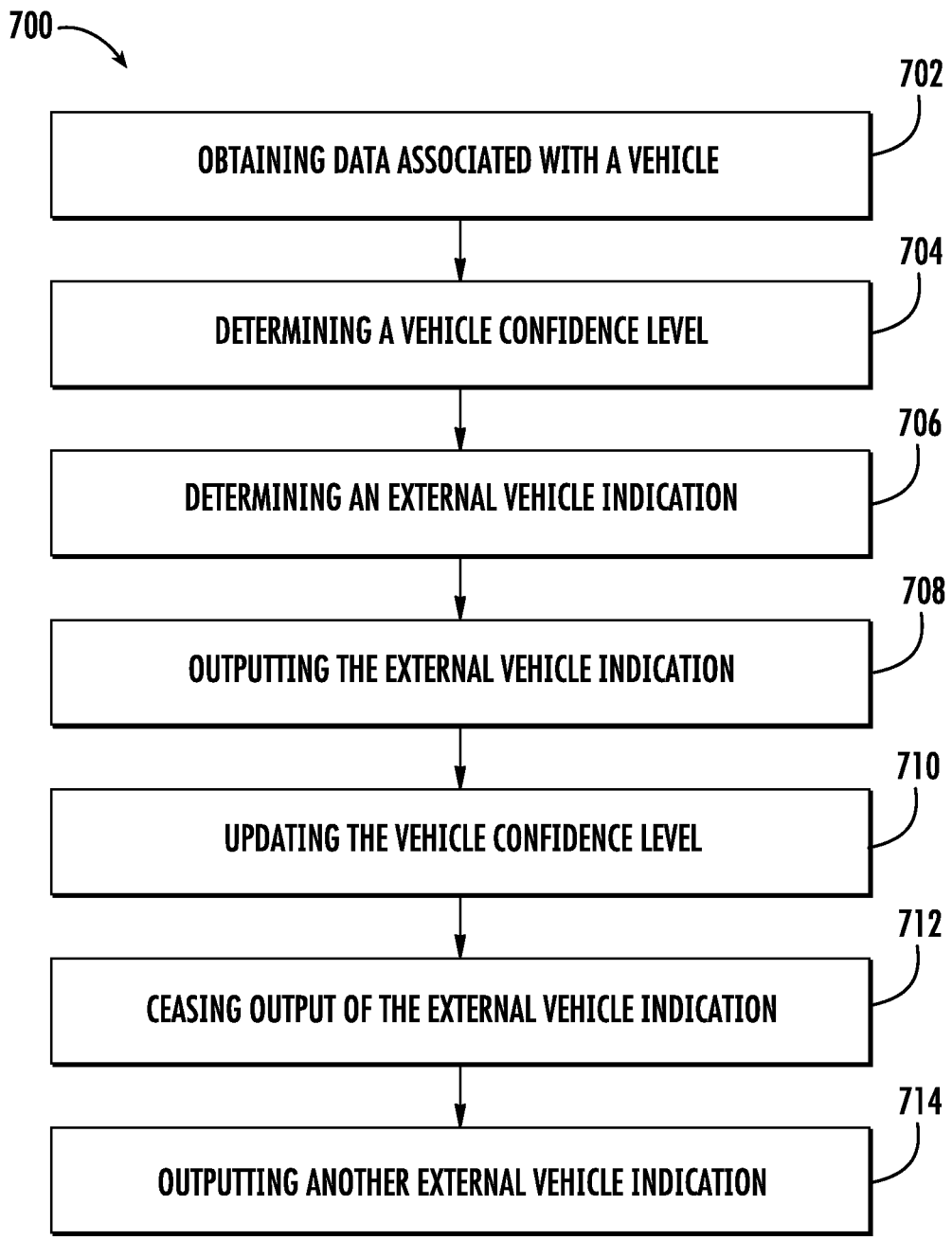
FIG. 7 depicts a flow diagram of an example method of communicating autonomous vehicle confidence levels according to example embodiments of the present disclosure.

FIG. 7 depicts a flow diagram of an example method 700 of communicating autonomous vehicle confidence levels according to example embodiments of the present disclosure. One or more portion(s) of the method 700 can be implemented by one or more computing devices such as, for example, the one or more computing device(s) of the vehicle computing system 102 (e.g., onboard the vehicle 104). Each respective portion of the method 700 (e.g., 702-714) can be performed by any (or any combination) of the one or more computing devices. Moreover, one or more portion(s) of the method 700 can be implemented as an algorithm on the hardware components of the device(s) described herein (e.g., as in FIGS. 1 and 8), for example, to communicate autonomous vehicle confidence levels. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (702), the method 700 can include obtaining data associated with a vehicle. For instance, the vehicle computing system 102 can obtain data associated with the vehicle 104. Such data can be created onboard the vehicle 104 (e.g., by an autonomy computing system 114) as the vehicle 104 travels through its surrounding environment without user input from a human operator 108. As described herein, the data associated with the vehicle 104 can include at least one of state data 130, prediction data 132, or motion plan 134. Such data can be obtained via at least one of a perception system 124 of the vehicle 104, a prediction system 126 of the vehicle 104, or a motion planning system 128 of the vehicle 104.

At (704), the method 700 can include determining a vehicle confidence level. For instance, the vehicle computing system 102 can determine a vehicle confidence level 138 (e.g., a first vehicle confidence level) associated with the vehicle 104 based at least in part on the data associated with the vehicle 104. The vehicle confidence level 138 can be associated with one or more system actions of the vehicle 104 based at least in part on the data associated with the vehicle 104. The one or more system actions can be performed by an autonomy computing system 114 of the vehicle 104. The one or more system actions can include at least one of perceiving one or more objects 202A-C within the surrounding environment of the vehicle 104, predicting a motion of at least one of the one or more objects 202A-C within the surrounding environment of the vehicle 104, or planning a motion of the vehicle 104. In some implementations, the vehicle confidence level 138 can be based at least in part on cost data 135 utilized by the vehicle 104 (e.g., the autonomy computing system 114) to plan a motion of the vehicle 104.

In some implementations, the vehicle confidence level 138 can be based at least in part on one or more conditions associated with the surrounding environment of the vehicle 104. For example, the one or more conditions associated with the surrounding environment of the vehicle 104 can include at least one of a weather condition associated with the surrounding environment of the vehicle 104 or a distance between an object 304 within the surrounding environment to the vehicle 104, as described herein.

At (706), the method 700 can include determining an external vehicle indication. For instance, the vehicle computing system 102 can determine an external vehicle indication 140 that is indicative of the vehicle confidence level 138. In some implementations, the vehicle computing system 102 can determine the external vehicle indication 140 based at least in part on a data structure 400. The vehicle computing system 102 can access the data structure 400 (e.g., stored in a memory located onboard the vehicle 104 and/or a remotely accessible memory off-board the vehicle 104). The data structure 400 can be indicative of a color scheme 402 that identifies a plurality of colors associated with a plurality of vehicle confidence levels. The plurality of vehicle confidence levels can include the determined vehicle confidence level 138. The vehicle computing system 102 can identify a color of the plurality of colors for the determined vehicle confidence level 138 based at least in part on the data structure 400.

At (708), the method 700 can include outputting the external vehicle indication. For instance, the vehicle computing system 102 can output, via an output device 142 onboard the vehicle 104, the external vehicle indication 140 that is indicative of the vehicle confidence level 138. The external vehicle indication 140 can be outputted to at least a portion of a surrounding environment of the vehicle 104. In some implementations, the output device 142 can include one or more lighting elements and the external vehicle indication 140 can include a visual indication that is provided via the one or more lighting elements. The vehicle computing system 102 can output the visual indication via the one or more lighting elements. In some implementations, the external vehicle indication 140 (e.g., the visual indication) can include an identified color (e.g., identified based at least in part on the data structure 400). The vehicle computing system 102 can provide one or more control signals (e.g., to one or more controllers associated with the output device(s) 142) to cause the output device(s) 142 to output the external vehicle indication 140. For example, the vehicle computing system 102 can provide one or more control signals to illuminate the one or more lighting elements to produce light in accordance with an identified color.

At (710), the method 700 can include updating the vehicle confidence level. For example, the vehicle computing system 102 can obtain a second set of data associated with the vehicle 104. The second set of data can include updated state data, updated prediction data, updated motion planning data, and/or other data, as described herein. The vehicle computing system 102 can identify a second vehicle confidence level 144 associated with the vehicle 104 (e.g., the autonomy system's object perception, object motion prediction, motion planning, etc.) based at least in part on the second set of data. The vehicle computing system 102 can determine a second external vehicle indication 146 that is indicative of a second vehicle confidence level 144. The vehicle computing system 102 can cease the output of the first external vehicle indication 140 (e.g., by providing one or more control signals to stop output of the first external vehicle indication 140 via the output device(s) 142), at (712). The vehicle computing system 102 can output, via the output device(s) 142 onboard the vehicle 104, the second external vehicle indication 146 that is indicative of the second vehicle confidence level 144, at (714). For example, the vehicle computing system 102 can provide one or more control signals to output the second external vehicle indication 146 via the output device(s) 142. In this way, the vehicle computing system 102 can provide updated information regarding the vehicle's current confidence level.

Figure 8:
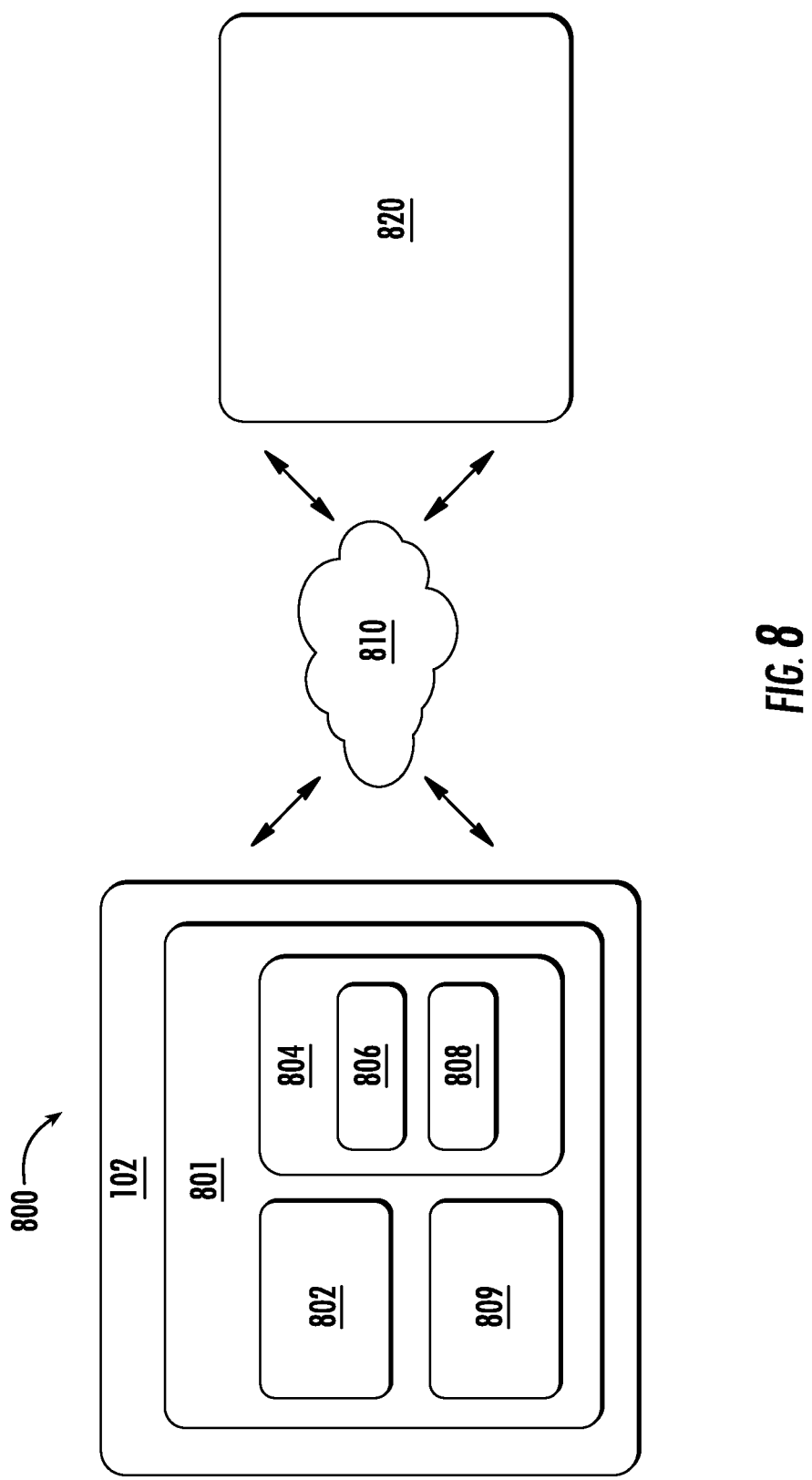
FIG. 8 depicts example system components according to example embodiments of the present disclosure.

FIG. 8 depicts an example system 800 according to example embodiments of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The example system 800 can include the vehicle computing system 102 of the vehicle 104 and a remote computing system 820 (e.g., the operations computing system 106) that can be communicatively coupled to one another over one or more networks 810. The remote computing system 820 can be associated with a central operations system and/or an entity associated with the vehicle 104 such as, for example, a vehicle owner, vehicle manager, fleet operator, service provider, etc.

The computing device(s) 801 of the vehicle computing system 102 can include processor(s) 802 and a memory 804. The one or more processors 802 can be any suitable processing device (e.g., a processor core, a microprocessor, an ASIC, a FPGA, a controller, a microcontroller, etc.) and can be one processor or a plurality of processors that are operatively connected. The memory 804 can include one or more non-transitory computer-readable storage media, such as RAM, ROM, EEPROM, EPROM, one or more memory devices, flash memory devices, data registrar, etc., and combinations thereof.

The memory 804 can store information that can be accessed by the one or more processors 802. For instance, the memory 804 (e.g., one or more non-transitory computer-readable storage mediums, memory devices) on-board the vehicle 104 can include computer-readable instructions 806 that can be executed by the one or more processors 802. The instructions 806 can be software written in any suitable programming language or can be implemented in hardware. Additionally, or alternatively, the instructions 806 can be executed in logically and/or virtually separate threads on processor(s) 802.

For example, the memory 804 on-board the vehicle 104 can store instructions 806 that when executed by the one or more processors 802 on-board the vehicle 104 cause the one or more processors 802 (the vehicle computing system 102) to perform operations such as any of the operations and functions of the vehicle computing system 102, the operations and functions for performing system actions (e.g., perceiving objects within the vehicle's surrounding environment, predicting object motion, planning vehicle motion, etc.), the operations and functions for communicating autonomous vehicle confidence levels (e.g., one or more portions of method 700), operations and functions for causing a vehicle to perform vehicle motion actions, and/or any other operations and functions of the vehicle computing system 102, as described herein.

The memory 804 can store data 808 that can be obtained, received, accessed, written, manipulated, created, and/or stored. The data 808 can include, for instance, data associated with a vehicle (e.g., data associated with object(s) (e.g., object classifications), data associated with predicted object motion, data associated with vehicle motion plans, etc.), data associated with vehicle confidence levels, a data structure that can be used to determine an external vehicle indication, data associated with an external vehicle indication, and/or other data/information as described herein. In some implementations, the computing device(s) 801 can obtain data from one or more memories that are remote from the vehicle 104.

The computing device(s) 801 can also include a communication interface 809 used to communicate with one or more other system(s) on-board the vehicle 104 and/or a remote computing device that is remote from the vehicle 104 (e.g., of the operations computing system 106). The communication interface 809 can include any circuits, components, software, etc. for communicating via one or more networks (e.g., 810). In some implementations, the communication interface 809 can include, for example, one or more of a communications controller, receiver, transceiver, transmitter, port, conductors, software and/or hardware for communicating data.

The network(s) 810 can be any type of network or combination of networks that allows for communication between devices. In some embodiments, the network(s) 810 can include one or more of a local area network, wide area network, the Internet, secure network, cellular network, mesh network, peer-to-peer communication link and/or some combination thereof and can include any number of wired or wireless links. Communication over the network(s) 810 can be accomplished, for instance, via a communication interface using any type of protocol, protection scheme, encoding, format, packaging, etc.

The remote computing system 820 can include one or more remote computing devices that are remote from the vehicle computing system 102. The remote computing devices can include components (e.g., processor(s), memory, instructions, data) similar to that described herein for the computing device(s) 801. Moreover, the remote computing system 810 can be configured to perform one or more operations of the operations computing system 106, as described herein.

Computing tasks discussed herein as being performed at computing device(s) remote from the vehicle can instead be performed at the vehicle (e.g., via the vehicle computing system), or vice versa. Moreover, computing tasks discussed herein as being performed by the operations computing system can be performed by another computing system. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for communicating autonomous vehicle confidence levels, comprising:
    perceiving, by a computing system comprising one or more computing devices, one or more objects within a surrounding environment of an autonomous vehicle;
    predicting, by the computing system, a motion of at least one of the one or more objects within the surrounding environment of the autonomous vehicle;
    obtaining, by the computing system, data associated with the autonomous vehicle, wherein the data associated with the autonomous vehicle comprises at least one of data associated with perceiving the one or more objects or data associated with predicting the motion of the at least one of the one or more objects;
    determining, by the computing system, a vehicle confidence level associated with the autonomous vehicle identifying the one or more objects within the surrounding environment or predicting the motion of the at least one of the one or more objects based at least in part on the data associated with the autonomous vehicle;
    determining, by the computing system, an external vehicle indication that is indicative of the vehicle confidence level; and
    outputting, by the computing system via an output device onboard the autonomous vehicle, the external vehicle indication that is indicative of the vehicle confidence level, wherein the external vehicle indication is outputted to at least a portion of the surrounding environment of and communicated from the exterior of the autonomous vehicle.

2. The computer-implemented method of claim 1, wherein the vehicle confidence level is based at least in part on one or more conditions associated with the surrounding environment of the autonomous vehicle.

3. The computer-implemented method of claim 2, wherein the one or more conditions associated with the surrounding environment of the autonomous vehicle comprise at least one of a weather condition associated with the surrounding environment or a distance between an object within the surrounding environment to the autonomous vehicle.

4. The computer-implemented method of claim 1, wherein the output device comprises one or more lighting elements, and wherein the external vehicle indication comprises a visual indication that is provided via the one or more lighting elements.

5. The computer-implemented method of claim 4, wherein determining, by the computing system, the external vehicle indication that is indicative of the vehicle confidence level comprises:
    accessing, by the computing system, a data structure stored in a memory located onboard the autonomous vehicle, wherein the data structure is indicative of a color scheme that identifies a plurality of colors associated with a plurality of vehicle confidence levels, wherein the plurality of vehicle confidence levels includes the determined vehicle confidence level; and
    identifying, by the computing system, a color of the plurality of colors for the determined vehicle confidence level based at least in part on the data structure,
    wherein outputting, by the computing system via the output device onboard the autonomous vehicle, the external vehicle indication comprises outputting the visual indication via the one or more lighting elements, wherein the external vehicle indication comprises the identified color.

6. The computer-implemented method of claim 5, wherein outputting the visual indication via the one or more lighting elements comprises:

providing, by the computing system, one or more control signals to illuminate the one or more lighting elements to produce light in accordance with the identified color.

7. A computing system for communicating autonomous vehicle confidence levels, comprising:
one or more processors; and
one or more memory devices, the one or more memory devices storing instructions that when executed by the one or more processors cause the computing system to perform operations, the operations comprising:
perceiving one or more objects within a surrounding environment of an autonomous vehicle;
predicting a motion of at least one of the one or more objects within the surrounding environment of the autonomous vehicle;
obtaining a first set of data associated with the autonomous vehicle, wherein the first set of data associated with the autonomous vehicle comprises at least one of data associated with perceiving the one or more objects or data associated with predicting the motion of the at least one of the one or more objects;
determining a first vehicle confidence level associated with the autonomous vehicle identifying the one or more objects within the surrounding environment or predicting the motion of the at least one of the one or more objects based at least in part on the first set of data associated with the autonomous vehicle; determining a first external vehicle indication that is indicative of the first vehicle confidence level; and
outputting, via an output device onboard the autonomous vehicle, the first external vehicle indication that is indicative of the first vehicle confidence level, wherein the first external vehicle indication is outputted to at least a portion of the surrounding environment of and communicated from the exterior of the autonomous vehicle.

8. The computing system of claim 7, wherein the first set of data associated with the autonomous vehicle is obtained via at least one of a perception system of the autonomous vehicle or a prediction system of the autonomous vehicle.

9. The computing system of claim 7, wherein the operations further comprise:
obtaining a second set of data associated with the autonomous vehicle;
identifying a second vehicle confidence level associated with the autonomous vehicle based at least in part on the second set of data associated with the autonomous vehicle;
ceasing the output of the first external vehicle indication; and
outputting, via the output device onboard the autonomous vehicle, a second external vehicle indication that is indicative of the second vehicle confidence level.

10. The computing system of claim 7, wherein the output device comprises an audio output device, and wherein the first external vehicle indication comprises an auditory indication.

11. The computing system of claim 10, wherein outputting, via the output device onboard the autonomous vehicle, the first external vehicle indication comprises:
providing, by the computing system, one or more control signals to cause the audio output device to audibly produce the auditory indication.

12. The computing system of claim 7, wherein determining the first vehicle confidence level comprises:
accessing, by the computing system, a data structure stored onboard the autonomous vehicle; and
determining, by the computing system, the first external vehicle indication based at least in part on the data structure.

13. An autonomous vehicle, comprising:
one or more output devices;
one or more processors; and
one or more memory devices, the one or more memory devices storing instructions that when executed by the one or more processors cause the autonomous vehicle to perform operations, the operations comprising:
perceiving one or more objects within a surrounding environment of the autonomous vehicle;
predicting a motion of at least one of the one or more objects within the surrounding environment of the autonomous vehicle;
obtaining data associated with the autonomous vehicle, wherein the data associated with the autonomous vehicle comprises at least one of data associated with perceiving the one or more objects or data associated with predicting the motion of the at least one of the one or more objects;
determining a vehicle confidence level associated with the autonomous vehicle identifying the one or more objects within the surrounding environment or predicting the motion of the at least one of the one or more objects based at least in part on the data associated with the autonomous vehicle;
determining an external vehicle indication that is indicative of the vehicle confidence level; and
outputting, via the one or more output devices, the external vehicle indication that is indicative of the vehicle confidence level, wherein the external vehicle indication is outputted to at least a portion of the surrounding environment of and communicated from the exterior of the autonomous vehicle.

14. The autonomous vehicle of claim 13, wherein the autonomous vehicle further comprises a Light Detection and Ranging system, and wherein the Light Detection and Ranging system comprises the one or more output devices.

15. The autonomous vehicle of claim 13, wherein the one or more output devices are configured to produce a ground lighting effect associated with the external vehicle indication.

16. The autonomous vehicle of claim 13, wherein the data associated with the autonomous vehicle is created onboard the autonomous vehicle as the autonomous vehicle travels through the surrounding environment without user input from a human operator present in the autonomous vehicle.

* * * * *